United States Patent
Shen et al.

(10) Patent No.: US 9,779,370 B2
(45) Date of Patent: Oct. 3, 2017

(54) MONITORING USER STATUS BY COMPARING PUBLIC AND PRIVATE ACTIVITIES

(71) Applicant: Palo Alto Research Center Incorporated, Palo Alto, CA (US)

(72) Inventors: Jianqiang Shen, Santa Clara, CA (US); Oliver Brdiczka, Mountain View, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 471 days.

(21) Appl. No.: 14/486,941

(22) Filed: Sep. 15, 2014

(65) Prior Publication Data
US 2016/0078353 A1 Mar. 17, 2016

(51) Int. Cl.
G06N 5/04 (2006.01)
G06Q 10/06 (2012.01)
G06Q 50/00 (2012.01)

(52) U.S. Cl.
CPC ............ G06Q 10/06 (2013.01); G06Q 50/01 (2013.01); G06N 5/04 (2013.01)

(58) Field of Classification Search
CPC .......... G06Q 10/06; G06Q 50/01; G06N 5/04; G06N 5/046; G06N 99/005
USPC ........................................................... 706/12
See application file for complete search history.

(56) References Cited

U.S. PATENT DOCUMENTS

2013/0006678 A1* 1/2013 Bellotti ................ G06Q 10/109
705/7.11
2014/0165195 A1* 6/2014 Brdiczka ............... G06F 21/552
726/23

\* cited by examiner

*Primary Examiner* — Dave Misir
(74) *Attorney, Agent, or Firm* — Shun Yao; Park, Vaughan, Fleming & Dowler LLP (57) ABSTRACT

One embodiment of the present invention provides a system for detecting anomalous correlations between public and private activities of a user. During operation, the system collects public and private activity data associated with the user. The system generates a series of feature pairs, each feature pair including a public feature vector and a private feature vector generated from the activity data. Each respective feature pair corresponds to a respective point in time. The system generates a model to determine whether there is an anomaly in a correlation between the user's public and private activity data. The model is associated with a normal correlation between the user's public and private activity data over a period of time. The system collects additional public and private activity data and applies the model to determine whether there is an anomaly. The system may issue an alert in response to detecting an anomaly.

18 Claims, 5 Drawing Sheets

MONITORING USER STATUS BY COMPARING PUBLIC AND PRIVATE ACTIVITIES

STATEMENT OF GOVERNMENT-FUNDED RESEARCH

This invention was made with U.S. government support under Contract No. W911NF-11-C-0216 ARO-Glad PC (ADAMS). The U.S. government has certain rights in this invention.

BACKGROUND

Field

The present disclosure is generally related to artificial intelligence. More specifically, this disclosure relates to a method and system for detecting anomalous user activity by comparing the user's public and private activities and detecting changes in the correlation between the activities.

Related Art

Organizations have an interest in detecting when an employee may be acting against the interests of the organization. Some approaches to detecting such employee behavior include focusing on detecting anomalous insider activity by clustering users with a multi-domain probability model. These approaches detect anomalies by using clustering information to compare a user's activities with activities of other users in similar roles. Other approaches focus on estimating a person or group's intention to quit an organization, and may compute a score indicating an entity's intention to quit. However, these approaches may be insufficient for some organizations, and organizations may seek additional methods for detecting anomalous employee activity.

SUMMARY

One embodiment of the present invention provides a system for detecting anomalous correlations between public and private activities of a user. During operation, the system collects public activity data and private activity data associated with the user. The system then generates a series of feature pairs, each feature pair including a public feature vector generated from public activity data and a private feature vector generated from private activity data. Note that a respective feature pair corresponds to a respective point in time. The system then generates a model, based on at least the series of feature pairs, to determine whether there is an anomaly in a correlation between the user's public activity data and the user's private activity data. The model is associated with a normal correlation between the user's public activity data and the user's private activity data over a period of time associated with the series of feature pairs. The system then collects additional public activity data and additional private activity data associated with the user. The system subsequently applies the model to determine whether there is an anomaly in the correlation between the user's additional public activity data and additional private activity data. The system may issue an alert in response to detecting an anomaly in the correlation between the additional public activity data and the additional private activity data of the user.

In a variation on this embodiment, the model is a one-class support vector machine, and generating the model includes training a one-class support vector machine with the series of feature pairs.

In a variation on this embodiment, the model is a rules-based model. The system obtains rules for detecting anomalies in the public activity data and private activity data, and generating the model includes generating the rules-based model using the obtained rules and the series of feature pairs.

In a variation on this embodiment, the method includes generating public feature vectors and private feature vectors with features that include one or more of: count of positive, negative, and/or neutral words that are in the user's written content; count of strongly and/or weakly subjective words that are in the user's written content; count of punctuation characters for each predetermined number of words in the text; count of average number of part-of-speech (POS) tags; count of individual persons that the user sent emails to; count of social networking friends that the user left a comment for or showed support or enjoyment of; count of received and/or sent emails; count of shared posts, photos, and videos; count of newly emailed persons; count of recently added friends on a social networking service; topic distribution of written content, including emails and discussions on the social networking service; and changing trends of one or more features.

In a variation on this embodiment, detecting an anomaly includes detecting a change beyond a predetermined threshold in one or more of the following correlations over a predetermined period of time: correlation of private activity sentiment level and public activity sentiment level; correlation between a count of events on a social networking service and a count of sent emails; correlation between a number of new email communication partners and a number of new friends added to the social networking service; correlation between the rate of adding new connections on the social networking service and the rate of adding new email communication partners; correlation between frequency of use of the social networking service and frequency of use of private communications; correlation between the number of emails and the number of posts on the social networking service; correlation between topics that the user mentions in private communications and topics that the user mentions on the social networking service; and correlation between the use of positive language on the social networking service and the use of positive language in private communications.

In a variation on this embodiment, the method includes calculating a feature with a sliding window by analyzing data within a given range before and after each point in time.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of detecting a user's anomalous online activity by comparing the user's public activities with the user's private activities and detecting changes in correlation between the two sets of activities that may indicate an anomaly. An anomaly detection system generates a model representing the user's normal behavior from historical data. The system monitors user status and compares the similarity and difference between the user's past public activities and past private activities. The system determines how the user historically behaves for public activities in comparison with private activities, and detects an anomaly when there is a variation from that behavioral correlation in new activity. The system can continuously monitor the status of the user to detect any type of anomaly. This includes detecting whether the user is suicidal, whether the user intends to leave a company, or whether the user intends to steal information. The system may issue an alert when it detects an anomaly.

User activity data includes public activity data and private activity data. Public activities include activities viewable to the public or to a large group of persons. Public activity data indicates the user's activities on social networking services such as Facebook, microblogging services such as Twitter, and other similar services. Examples of public events include the user sharing a post or photo, updating a profile, and adding a friend on a social networking service. Private activity includes user activity viewable to only one or several individuals and is not intended to be publicly viewable. Private activity data may indicate, for example, the user's email, instant messaging, or file-sharing activities. Examples of private events include the user sending an email to a person, sharing a file with a person, and sending an instant message to a person.

In order to determine the user's normal online behavior, the system generates a series of feature pairs $F_{t-1}$, $F_{t-2}$, ..., $F_1$ representing past observations of the user's activities. The system may generate a feature pair $F_t = <f_{public}, f_{private}>$, where $f_{public}$ is a feature vector including values of extracted features for public activity data and $f_{private}$ is a feature vector including values of extracted features for private activity data. A feature vector is an n-dimensional vector of numerical features associated with public activity or private activity at a point in time t.

The system builds a model from the series of feature pairs. The system can analyze a series of feature pairs to learn and generate a model representing the user's typical behavior. The system applies the model to new feature pairs associated with new activity data to determine whether there is an anomaly. When the user's activities deviate from the typical behavior, the system detects an anomaly and issues an alert.

This disclosure describes different approaches for generating the model, including both a rules-based approach to generating the model for detecting an anomaly and a machine-learning approach to generating the model for detecting the anomaly.

In one embodiment, domain experts write rules to detect anomalies. The system uses the rules and the historical activity data to generate a model that generalizes the past observations of the user's public and private activities. When the system receives a new observation, the system uses this model to evaluate the difference between the new observation and past observations. If the system determines that there is a significant difference between the new observation and past observations, the system issues an anomaly alert. For example, the system may issue an anomaly alert if it determines that the user would typically add a person as a Facebook friend after emailing the person for the first time, but then at some point in time the user ceases to add new friends on Facebook after emailing new people.

With the machine-learning embodiment, the system trains a classifier (e.g., learns a normalcy model), such as a one-class support vector machine (SVM). With a one-class SVM, a system can have training data of only one class, and determine whether new data is like the training data or not. This is called unary classification. The system can train the one-class SVM on the past observations of the user activity. These past observations represent the user's normal correlations between public and private online activity. The system then applies the classifier to the new observations (e.g., new activity data for the user). The system issues an alert if the classifier detects that new activity data is not like the class of data from the training. For example, the system may issue an anomaly alert if the user previously only used email occasionally but used Facebook almost every day, and then suddenly reduces the number of public Facebook postings to almost zero while increasing the number of private messages and emails significantly.

To the inventors' knowledge, this is the first disclosure on monitoring both public activities and private activities to compare and contrast the two sets of activities, and to detect changes in the correlation between the two sets of activity data. Others may have proposed techniques for analyzing only public activities, or analyzing only private activities. However, there have not been any proposals to contrast public activities with private activities and to detect changes in the normal relations between the two sets of activities.

System Architecture

Figure 1:
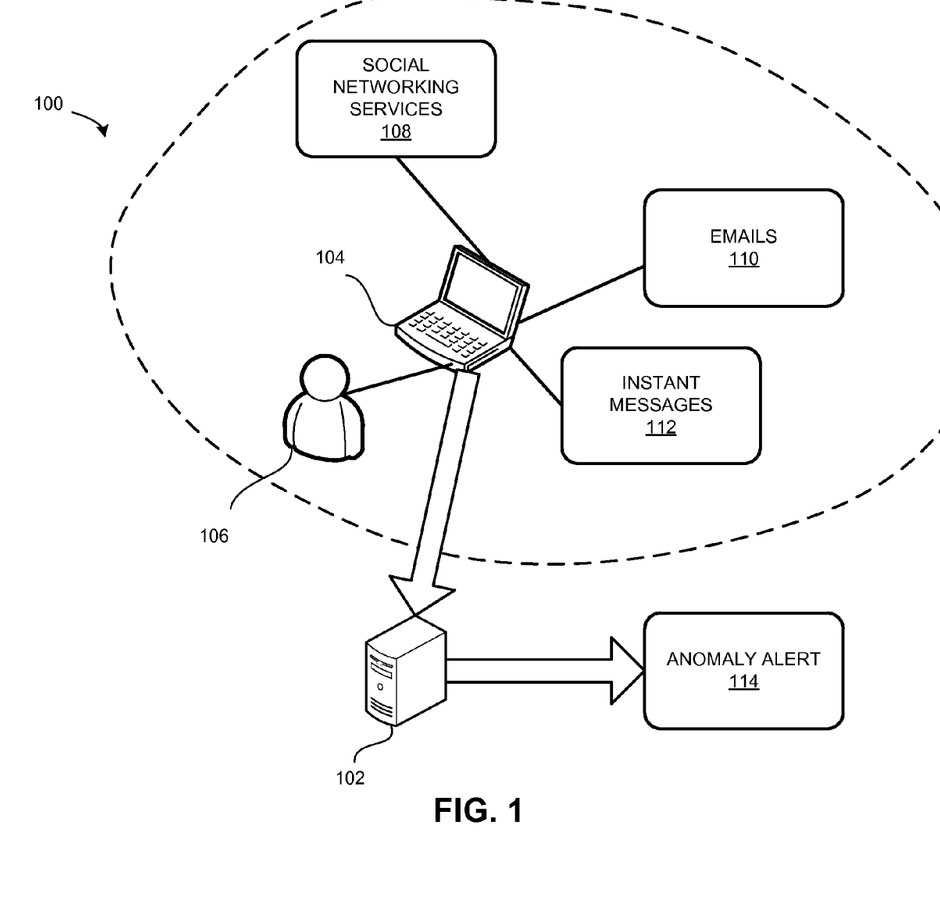
FIG. 1 presents a block diagram illustrating an exemplary context of an anomaly detection system, according to an embodiment.

FIG. 1 presents a block diagram illustrating an exemplary context of an anomaly detection system 100, according to an embodiment. As illustrated in FIG. 1, system 100 includes a server 102 monitoring user activity data received from computing device 104. A user 106 may use computing device 104 to access social networking services 108, to send and receive emails 110, and to send instant messages 112. Other services that server 102 may monitor for public activity include microblogging services such as Twitter. Other services that server 102 may monitor for private activity include file-sharing services.

Server 102 may receive data indicating public activities, such as activities on social networking services. These activities include the user posting messages on social networking services 108, or the user giving a "like" to a post. Server 102 may also receive data indicating private activity, such as emails 110 or instant messages 112.

Server 102 may detect an anomaly and issue an anomaly alert 114 to notify an administrator of the anomalous activity. The anomaly alert 114 indicates that the system has detected activity data in which the correlation between the user's public activities and user's private activities deviates from the "normal" correlation found in the training data. For example, user 106 may have been posting many messages to Facebook and sending many emails in the past, but has now ceased to publicly post messages, while continuing to send many private messages/emails. This change in the correlation between public and private activities may indicate an anomaly. Server 102 may also save the anomaly alert 112 as a log entry.

Examples of Anomalous User Activity

Some examples of anomalous activity are provided below. In some implementations, domain experts may write rules to detect the anomalies described below, and the system may build a model using the rules and past observations of activity data. Furthermore, in some implementations, the system may represent a correlation as a fractional value or percentage of the public and private events being compared. In some implementations, the system may determine that a change indicates an anomaly when the change exceeds a predetermined threshold over a predetermined period of time.

- Past: sentiment levels usually correlate well between private activities (e.g., emails) and public activities (e.g., Facebook posts). Present: the direction of the correlation reverses. For example, the correlation between public and private activities was negative, and is now positive. Alternatively, the correlation between public and private activities was positive, and now the correlation is negative. This reversal (e.g., change beyond a predetermined threshold) in correlation between public and private activities might indicate an anomaly.

- Let x represent the count of events on a social networking service (e.g., posts on Facebook), and y represent the count of sent emails (e.g., including professional email and/or private email). Past: the system can accurately perform regression analysis such that $y=a \times x+b$. Present: $y=c \times x+b$, and c is significantly larger than a, which may indicate an anomaly. In other words, the correlation between the count of events on the social networking service and the count of sent emails changes beyond a predetermined threshold.

- Past: when the user emails a person that he has never communicated with before, the user usually follows by adding more friends on a social networking service (e.g., Facebook). Present: the user sends email to new people, but does not add any of them as friends on the social networking service (e.g., Facebook), which may indicate an anomaly. In one implementation, this type of anomaly is indicated by a change beyond a predetermined threshold in a correlation between a number of new email communication partners and a number of new friends added to the social networking service over a predetermined period of time.

- Past: the rate of new connections on a social networking service (e.g., Facebook) versus the rate of new connections in private communications (e.g., email) has a steady correlation. Present: there's a sudden increase in the rate of adding new connections on the social networking service or a sudden increase in the rate of adding new email communication partners. This is a change beyond a predetermined threshold in the correlation between the rate of adding new connections on a social networking service and the rate of adding new email communication partners.

- Past: the user uses a social networking service extensively (e.g., Facebook is a major communication tool for the user) and the user uses email occasionally. Present: the user sends many private messages/emails, but makes almost no public posts, which may indicate an anomaly. This is a change in the correlation between frequency of use of a social networking service and frequency of use of private communications.

- Past: the number of emails and the number of posts on a social networking service (e.g., Facebook) are negatively correlated. Present: the number of emails and the number of posts on the social networking service become highly positively correlated. This is a reversal (e.g., change beyond a predetermined threshold) in the correlation between the number of emails and the number of posts on the social networking service, and it may indicate a problem with the user.

- Past: when mentioning a topic on a social networking service (e.g., Facebook), the user usually also mentioned it in some emails. Present: the topics in email and the social networking service posts have not been overlapping, which may suggest an anomaly. This is a change in the correlation between topics that the user mentions in private communications and topics that the user mentions on the social networking service.

- Past: when the user started writing more positively on a social networking service (e.g., Facebook), he also became more positive in emails. Present: the user becomes more negative on the social networking service, but more positive in emails, which may suggest an anomaly. This is a change in the correlation between the use of positive/negative language on a social networking service and the use of positive/negative language in private communications.

Examples of Extracted Features

The system monitors a user's computer activities and extracts features for analysis. The system may use a sliding window method to calculate features. At each point in time, the system analyzes the data within a given range before and after the point in time. The system then calculates features from that data. The system may compute the following exemplary features:

- Sentiment levels in social networking posts and emails. The system may count the number of positive, negative, and/or neutral words that are in the user's written content. The system may also count the number of strongly and/or weakly subjective words that are in the user's written content.

- Average punctuation counts in emails and social networking posts. The system counts the number of punctuation characters (e.g., commas, question marks, and exclamation marks) for each predetermined number of words (e.g., 100 words) in the text.

- Average part-of-speech (POS) tags in emails and social networking posts. The system may apply automatic POS tagging to the text and count the average number of POS tags.

- Count of individual persons that the user sent emails to, count of social networking friends that the user left a comment for or showed support or enjoyment of (e.g., on Facebook the user gave at least a "like").

- Count of email activities and count of social networking activities. This may be measured by count of received and/or sent emails, count of shared posts, photos, and/or videos.

- Count of newly emailed persons, count of recently added friends on a social networking service.

Topics discussed in emails and topics discussed on a social networking service. The system can analyze the topics of the user's written content. For example, the system can use Latent Dirichlet Allocation to determine a topic distribution of the user's written content.

The trend of the above features in emails and on social networking service. The system calculates the trend as the change of a value over a period of time. For a value $V_i$ at a time $T_i$, the system computes the trend as $(V_i-V_{i-1})/(T_i-T_{i-1})$. $V_i$ may represent the value of feature i (e.g., one of the above features), such as the count of email activities. The system may determine whether there is a change in the trend from positive to negative or from negative to positive.

Rules-Based Approach to Detecting Anomalies

Figure 2:
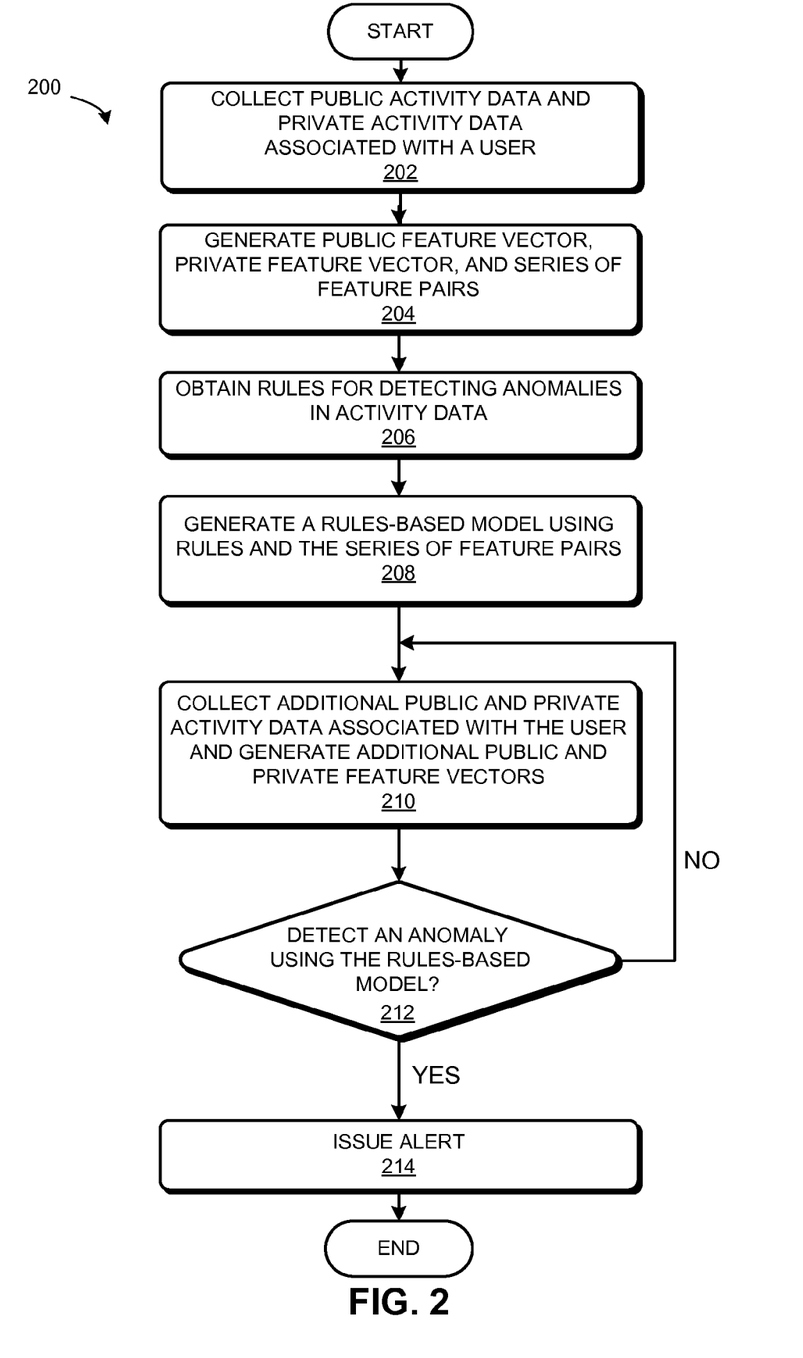
FIG. 2 presents a flowchart illustrating an exemplary process for a rules-based approach to monitoring a user's public and private activities for anomalies, according to an embodiment.

FIG. 2 presents a flowchart 200 illustrating an exemplary process for a rules-based approach to monitoring a user's public and private activities for anomalies, according to an embodiment. FIG. 2 illustrates one possible implementation, and specific details may vary according to implementation. As illustrated in FIG. 2, the system extracts features from user activity data, and builds a rules-based model to generalize past observations. The system then applies the rules-based model to evaluate the observations (e.g., new activity data). In some implementations, if the system determines that the differences between the new observation and the past observations are significantly different (e.g., the differences exceed a predetermined threshold), the system issues an anomaly alert.

During operation, the system initially collects public activity data and private activity data associated with a user (operation 202). The system generates a public feature vector and a private feature vector for each point in time t, and generates a series of feature pairs $F_{t-1}, F_{t-2}, \ldots, F_1$ (operation 204). A feature pair associated with a time t includes a public feature vector for the time t and a private feature vector for the time t. The system then obtains rules for detecting anomalies in activity data (operation 206). Subsequently, the system generates a rules-based model using the rules and the series of feature pairs (operation 208).

The system may then collect additional public activity data and private activity data associated with the user (operation 210). The system may generate additional public and private feature vectors, and generate one or more additional feature pairs. The system may use the rules-based model to determine whether there is an anomaly in the additional public activity data and private activity data (operation 212). The system may apply the rules-based model to the one or more additional feature pairs to detect anomalies. Note that to detect specific anomalies such as suicidal ideation, domain experts may provide additional rules to identify particular anomalies. If the system detects such an anomaly using the rules-based model, then the system may issue an alert (operation 214).

If the system does not detect an anomaly, then the system continues to collect additional public activity data and private activity data associated with the user (operation 210). The system may compute feature vectors from the additional public activity data and private activity data. The system continues to detect and issue alerts for any anomalies that may be present in the additional public activity data and private activity data (operations 212-214).

Machine-Learning Approach to Detecting Anomalies

In some implementations, the system may train a one-class SVM to detect anomalies. One-class classification, also known as unary classification, attempts to distinguish one class of objects from all other possible objects by learning from a training set containing only the objects of that class. Traditional classification tries to distinguish among two or more classes with the training set containing objects from all the classes. An example is the classification of the operational status of a nuclear plant as "normal." In this scenario, there are few or no examples of catastrophic system states; only the statistics of normal operation are known. After training a one-class SVM, the system may use the one-class SVM to determine whether the new observation is normal or not.

Figure 3:
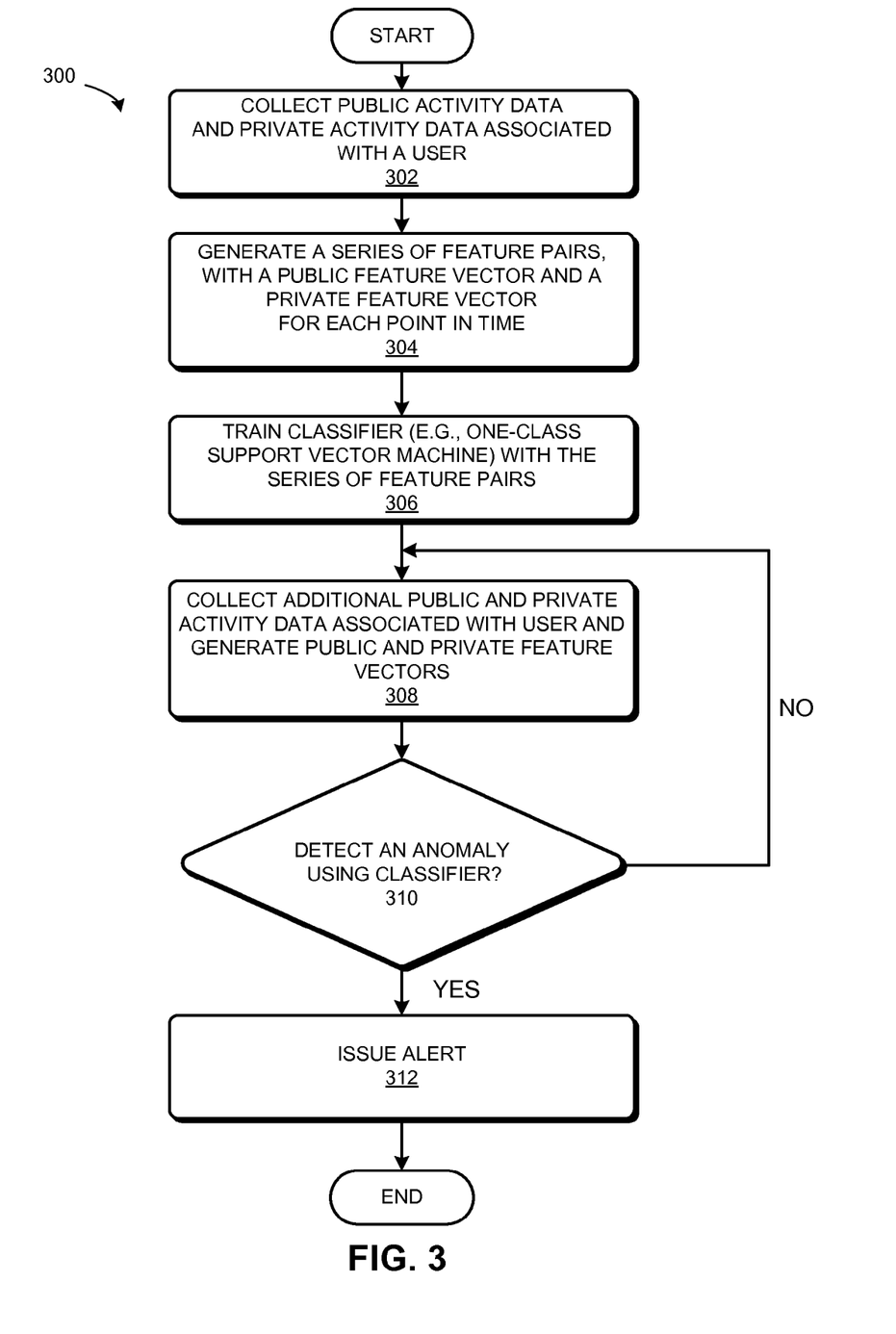
FIG. 3 presents a flowchart illustrating an exemplary process for a machine-learning approach to monitoring public and private activities of a user to detect anomalies, according to an embodiment.

FIG. 3 presents a flowchart 300 illustrating an exemplary process for a machine-learning approach to monitoring public and private activities of a user to detect anomalies, according to an embodiment. FIG. 3 illustrates one possible implementation, and specific details may vary according to implementation. As illustrated in FIG. 3, the system extracts features from user activity data, and trains a model (e.g., one-class SVM) to generalize past observations. The system then applies the classifier to classify new data as either anomalous or normal.

During operation, the system initially collects public activity data and private activity data associated with the user (operation 302). For example, the system may collect data related to social networking posts or emails.

The system generates a series of feature pairs $F_{t-1}, F_{t-2}, \ldots, F_1$ (operation 304). A feature pair associated with a time t includes a public feature vector for the time t and a private feature vector for the time t. A feature pair at time t is represented by $F_t=<f_{public}, f_{private}>$, where $f_{public}$ is a feature vector including values of extracted features for public activity data and $f_{private}$ is a feature vector including values of extracted features for private activity data. To compute the features, the system may use a sliding window method. The system analyzes data before and after this point in time within a predetermined threshold (e.g., predetermined range). The system may determine the counts of communications, posts, other events, and/or other data.

The system then trains a classifier with the series of feature pairs (operation 306). In some implementations, the system may use machine-learning methods to learn a normalcy model that generalizes the past observations of public and private activity data. The system may train a one-class SVM to learn the normal values of the series of feature pairs. The one-class SVM learns the normal correlations, including differences and similarities, between the public activities of the user and the private activities of the user. In one implementation, the one-class SVM learns the differences and similarities between $f_{public}$ and $f_{private}$ in the series of feature pairs.

The system may collect additional public activity data and private activity data associated with the user, and also generate public feature vectors and private feature vectors for the additional data (operation 308). The system may generate one or more feature pairs from the public feature vectors and private feature vectors for the additional data.

The system may use the classifier to determine whether there is an anomaly (operation 310). The system would detect an anomaly if there is a feature pair that the classifier determines is not normal, and is of a different class than the training data class. In other words, the differences and similarities between $f_{public}$ and $f_{private}$ associated with new activity data are different (e.g., beyond a predetermined threshold) from the historical differences and similarities. If the system detects such an anomaly using the classifier, then the system will issue an alert (operation 312). If the system does not detect an anomaly, the system continues to collect additional public and private activity data, and issues an alert if the system detects an anomaly (operations 308-312).

Exemplary Apparatus

Figure 4:
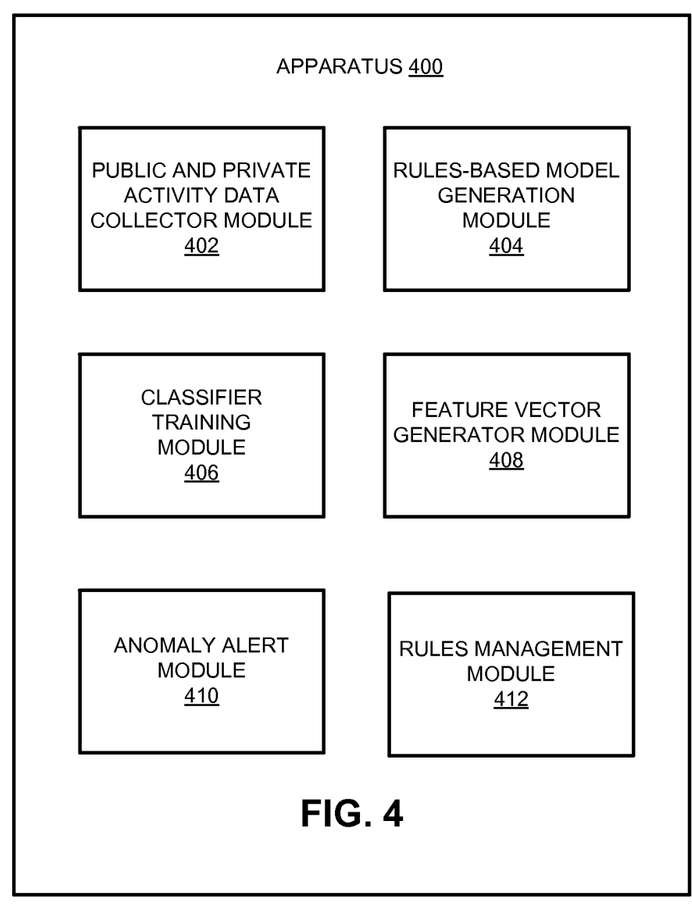
FIG. 4 illustrates an exemplary apparatus that may monitor public and private activities of the user to detect anomalies, in accordance with an embodiment.

FIG. 4 presents a block diagram illustrating an exemplary apparatus 400 for monitoring public and private activities of a user to detect anomalies, in accordance with an embodiment. Apparatus 400 can comprise a plurality of modules which may communicate with one another via a wired or wireless communication channel. Apparatus 400 may be realized using one or more integrated circuits, and may include fewer or more modules than those shown in FIG. 4. Further, apparatus 400 may be integrated in a computer system, or realized as a separate device which is capable of communicating with other computer systems and/or devices.

Specifically, apparatus 400 can comprise any combination of public and private activity data collector module 402, rules-based model generation module 404, classifier training module 406, feature vector generator module 408, anomaly alert module 410, and rules management module 412. Note that apparatus 400 may also include additional modules and data not depicted in FIG. 4, and different implementations may arrange functionality according to a different set of modules. Embodiments of the present invention are not limited to any particular arrangement of modules.

Public and private activity data collector module 402 collects public activity data and private activity data of a user being monitored. Rules-based model generation module 404 generates the rules-based model for detecting anomalies. Classifier training module 406 trains a classifier, such as a one-class SVM. Feature vector generator module 408 generates feature vectors from user activity data. Anomaly alert module 410 issues an anomaly alert. Rules management module 412 manages rules for detecting anomalies.

Exemplary System

Figure 5:
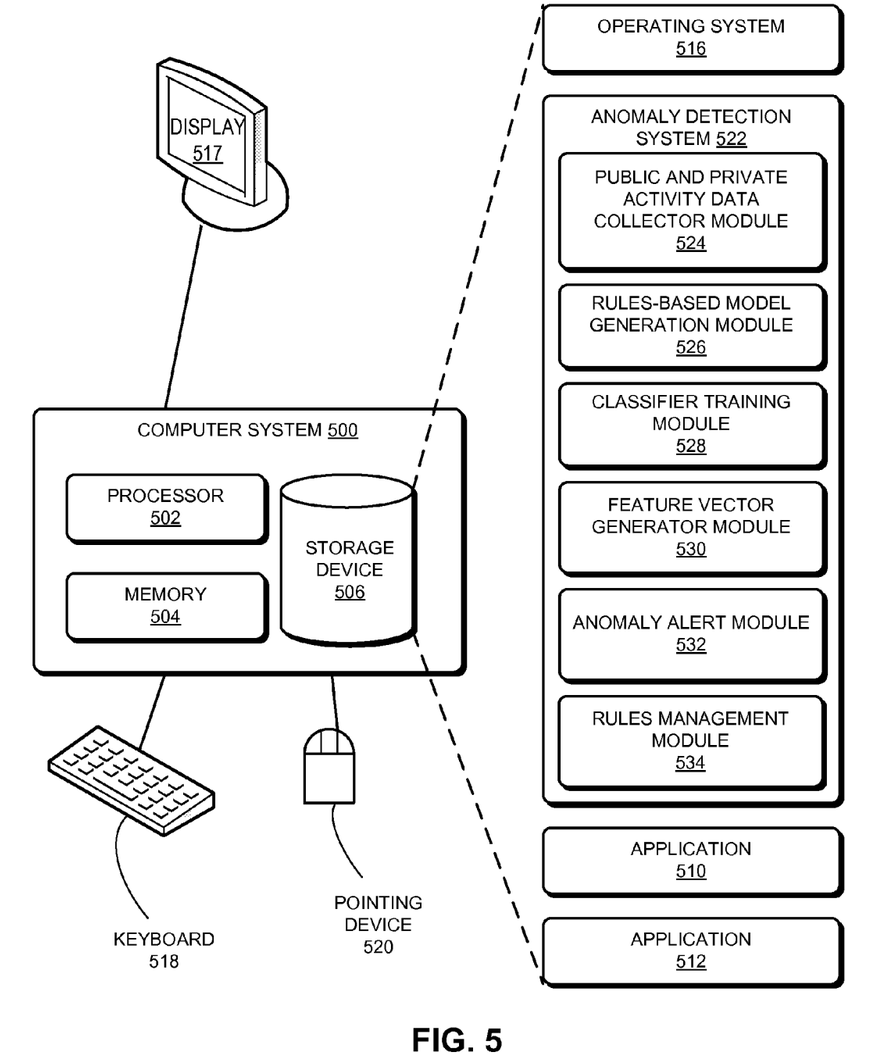
FIG. 5 illustrates an exemplary computer system that may monitor public and private activities of a user to detect anomalies, in accordance with an embodiment.

FIG. 5 illustrates an exemplary computer system that may monitor public and private activities of a user to detect anomalies, in accordance with an embodiment. In one embodiment, computer system 500 includes a processor 502, a memory 504, and a storage device 506. Storage device 506 stores a number of applications, such as applications 510 and 512, and operating system 516. Storage device 506 also stores code for anomaly detection system 522, which may include components such as public and private activity data collector module 524, rules-based model generation module 526, classifier training module 528, feature vector generator module 530, anomaly alert module 532, and rules management module 534.

During operation, one or more applications, such as anomaly detection system 522, are loaded from storage device 506 into memory 504 and then executed by processor 502. While executing the program, processor 502 performs the aforementioned functions. Computer system 500 may be coupled to an optional display 517, keyboard 518, and pointing device 520.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for detecting anomalous correlations between public and private activities of a user, comprising:
   collecting public activity data and private activity data associated with the user;
   generating a series of feature pairs, each feature pair including a public feature vector generated from public activity data and a private feature vector generated from private activity data, wherein a respective feature pair corresponds to a respective point in time;
   generating a model, based on at least the series of feature pairs, to determine whether there is an anomaly in a correlation between the user's public activity data and the user's private activity data, wherein the model is associated with a correlation between the user's public activity data and the user's private activity data over a period of time associated with the series of feature pairs;
   collecting additional public activity data and additional private activity data associated with the user;
   applying the model to determine whether there is an anomaly in the correlation between the additional public activity data and the additional private activity data; and
   issuing an alert in response to detecting an anomaly in the correlation between the additional public activity data and the additional private activity data of the user.

2. The method of claim 1, wherein the model is a one-class support vector machine; and
   wherein generating the model comprises training a one-class support vector machine with the series of feature pairs.

3. The method of claim 1, wherein the model is a rules-based model, further comprising:
   obtaining rules for detecting anomalies in the public activity data and the private activity data; and
   wherein the generating the model comprises generating the rules-based model using the obtained rules and the series of feature pairs.

4. The method of claim 1, further comprising generating the public feature vectors and the private feature vectors with features that include one or more of:

count of punctuation characters for each predetermined number of words in the text;
count of average number of part-of-speech (POS) tags;
count of individual persons that the user sent emails to;
count of social networking friends that the user left a comment for or showed support or enjoyment of;
count of received and/or sent emails;
count of shared posts, photos, and videos;
count of newly emailed persons;
count of recently added friends on a social networking service;
topic distribution of written content including emails and discussions on the social networking service; and
changing trends of one or more features.

5. The method of claim 1, wherein detecting an anomaly includes detecting a change beyond a predetermined threshold in one or more of the following correlations over a predetermined period of time:
correlation of private activity sentiment level and public activity sentiment level;
correlation between a count of events on a social networking service and a count of sent emails;
correlation between a number of new email communication partners and a number of new friends added to the social networking service;
correlation between a rate of adding new connections on the social networking service and a rate of adding new email communication partners;
correlation between frequency of use of the social networking service and frequency of use of private communications;
correlation between a number of emails and a number of posts on the social networking service;
correlation between topics that the user mentions in private communications and topics that the user mentions on the social networking service; and
correlation between use of language on the social networking service and use of language in private communications.

6. The method of claim 5, further comprising:
calculating a feature with a sliding window by analyzing data within a given range before and after each point in time.

7. A non-transitory computer-readable storage medium storing instructions that when executed by a computer cause the computer to perform a method for detecting anomalous correlations between public and private activities of a user, the method comprising:
collecting public activity data and private activity data associated with the user;
generating a series of feature pairs, each feature pair including a public feature vector generated from public activity data and a private feature vector generated from private activity data, wherein a respective feature pair corresponds to a respective point in time;
generating a model, based on at least the series of feature pairs, to determine whether there is an anomaly in a correlation between the user's public activity data and the user's private activity data, wherein the model is associated with a correlation between the user's public activity data and the user's private activity data over a period of time associated with the series of feature pairs;
collecting additional public activity data and additional private activity data associated with the user;
applying the model to determine whether there is an anomaly in the correlation between the additional public activity data and the additional private activity data; and
issuing an alert in response to detecting an anomaly in the correlation between the additional public activity data and the additional private activity data of the user.

8. The non-transitory computer-readable storage medium of claim 7, wherein the model is a one-class support vector machine; and
wherein generating the model comprises training a one-class support vector machine with the series of feature pairs.

9. The non-transitory computer-readable storage medium of claim 7, wherein the model is a rules-based model, and the method further comprises:
obtaining rules for detecting anomalies in the public activity data and the private activity data; and
wherein the generating the model comprises generating the rules-based model using the obtained rules and the series of feature pairs.

10. The non-transitory computer-readable storage medium of claim 7, wherein the method further comprises generating the public feature vectors and the private feature vectors with features that include one or more of:
count of punctuation characters for each predetermined number of words in the text;
count of average number of POS tags;
count of individual persons that the user sent emails to;
count of social networking friends that the user left a comment for or showed support or enjoyment of;
count of received and/or sent emails;
count of shared posts, photos, and videos;
count of newly emailed persons;
count of recently added friends on a social networking service;
topic distribution of written content including emails and discussions on the social networking service; and
changing trends of one or more features.

11. The non-transitory computer-readable storage medium of claim 7, wherein detecting an anomaly includes detecting a change beyond a predetermined threshold in one or more of the following correlations over a predetermined period of time:
correlation of private activity sentiment level and public activity sentiment level;
correlation between a count of events on a social networking service and a count of sent emails;
correlation between a number of new email communication partners and a number of new friends added to the social networking service;
correlation between a rate of adding new connections on the social networking service and a rate of adding new email communication partners;
correlation between frequency of use of the social networking service and frequency of use of private communications;
correlation between a number of emails and a number of posts on the social networking service;
correlation between topics that the user mentions in private communications and topics that the user mentions on the social networking service; and
correlation between use of language on the social networking service and use of language in private communications.

12. The non-transitory computer-readable storage medium of claim 7, wherein the method further comprises:

calculating a feature with a sliding window by analyzing data within a given range before and after each point in time.

13. A computing system for detecting anomalous correlations between public and private activities of a user, the system comprising:
one or more processors,
a non-transitory computer-readable medium coupled to the one or more processors having instructions stored thereon that, when executed by the one or more processors, cause the one or more processors to perform operations comprising:
collecting public activity data and private activity data associated with the user;
generating a series of feature pairs, each feature pair including a public feature vector generated from public activity data and a private feature vector generated from private activity data, wherein a respective feature pair corresponds to a respective point in time;
generating a model, based on at least the series of feature pairs, to determine whether there is an anomaly in a correlation between the user's public activity data and the user's private activity data, wherein the model is associated with a correlation between the user's public activity data and the user's private activity data over a period of time associated with the series of feature pairs;
collecting additional public activity data and additional private activity data associated with the user;
applying the model to determine whether there is an anomaly in the correlation between the additional public activity data and the additional private activity data; and
issuing an alert in response to detecting an anomaly in the correlation between the additional public activity data and the additional private activity data of the user.

14. The computing system of claim 13, wherein the model is a one-class support vector machine; and
wherein generating the model comprises training a one-class support vector machine with the series of feature pairs.

15. The computing system of claim 13, wherein the model is a rules-based model, wherein the non-transitory computer-readable storage medium stores additional instructions that, when executed, cause the one or more processors to perform additional steps comprising:
obtaining rules for detecting anomalies in the public activity data and the private activity data; and
wherein the generating the model comprises generating the rules-based model using the obtained rules and the series of feature pairs.

16. The computing system of claim 13, wherein the non-transitory computer-readable storage medium stores additional instructions that, when executed, cause the one or more processors to perform additional steps comprising:
generating the public feature vectors and the private feature vectors with features that include one or more of:
count of punctuation characters for each predetermined number of words in the text;
count of average number of POS tags;
count of individual persons that the user sent emails to;
count of social networking friends that the user left a comment for or showed support or enjoyment of;
count of received and/or sent emails;
count of shared posts, photos, and videos;
count of newly emailed persons;
count of recently added friends on a social networking service;
topic distribution of written content including emails and discussions on the social networking service; and
changing trends of one or more features.

17. The computing system claim 13, wherein detecting an anomaly includes detecting a change beyond a predetermined threshold in one or more of the following correlations over a predetermined period of time:
correlation of private activity sentiment level and public activity sentiment level;
correlation between a count of events on a social networking service and a count of sent emails;
correlation between a number of new email communication partners and a number of new friends added to the social networking service;
correlation between a rate of adding new connections on the social networking service and a rate of adding new email communication partners;
correlation between frequency of use of the social networking service and frequency of use of private communications;
correlation between a number of emails and a number of posts on the social networking service;
correlation between topics that the user mentions in private communications and topics that the user mentions on the social networking service; and
correlation between use of language on the social networking service and use of language in private communications.

18. The computing system of claim 13, wherein the non-transitory computer-readable storage medium stores additional instructions that, when executed, cause the one or more processors to perform additional steps comprising:
calculating a feature with a sliding window by analyzing data within a given range before and after each point in time.

* * * * *